United States Patent
McLaughlin et al.

(10) Patent No.: US 6,170,044 B1
(45) Date of Patent: Jan. 2, 2001

(54) SYSTEMS AND METHODS FOR SYNCHRONIZING REDUNDANT CONTROLLERS WITH MINIMAL CONTROL DISRUPTION

(75) Inventors: Paul Francis McLaughlin, Hatfield; Norman Raymond Swanson, Doylestown, both of PA (US)

(73) Assignee: Honeywell Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/993,336

(22) Filed: Dec. 19, 1997

(51) Int. Cl.[7] ...................................................... G06F 12/00
(52) U.S. Cl. .............................. 711/162; 711/112; 714/6
(58) Field of Search ..................................... 711/162, 111, 711/112, 154; 714/6, 7–13, 42, 44, 707

(56) References Cited

U.S. PATENT DOCUMENTS

| | | | |
|---|---|---|---|
| 5,088,021 | * | 2/1992 | McLaughlin et al. ................... 364/187 |
| 5,313,386 | * | 5/1994 | Cook et al. .............................. 364/187 |
| 5,379,417 | * | 1/1995 | Lui et al. ................................. 713/300 |
| 5,699,510 | * | 12/1997 | Petersen et al. .......................... 714/54 |
| 5,712,970 | * | 1/1998 | Arnott et al. ............................... 714/6 |
| 5,896,492 | * | 4/1999 | Chong, Jr. ................................ 711/162 |
| 5,912,814 | * | 6/1999 | Flood ....................................... 364/131 |
| 5,928,367 | * | 7/1999 | Nelson et al. ............................... 714/6 |
| 5,933,347 | * | 8/1999 | Cook et al. .............................. 364/187 |
| 5,987,566 | * | 11/1999 | Vishlitzky et al. ...................... 711/114 |

\* cited by examiner

*Primary Examiner*—John W. Cabeca
*Assistant Examiner*—Pierre-Michel Bataille
(74) *Attorney, Agent, or Firm*—William A. Munck

(57) ABSTRACT

There is disclosed a system and method for maintaining data coherency between a primary process controller operable to execute process control tasks and a backup process controller operable to replace the primary process controller upon failure, wherein the primary process controller cyclically executes the process control tasks during base control cycles having a period, T. The system comprises 1) a tracking circuit operable to detect changed data in a main memory in the primary process controller; 2) a data buffer for temporarily storing the changed data; and 3) data transfer circuitry for transferring the changed data in the data buffer to a backup memory in the backup process controller at least once during each base control cycle of the primary process controller, such that the transfer of changed data does not interfere with execution of the process control tasks.

21 Claims, 5 Drawing Sheets

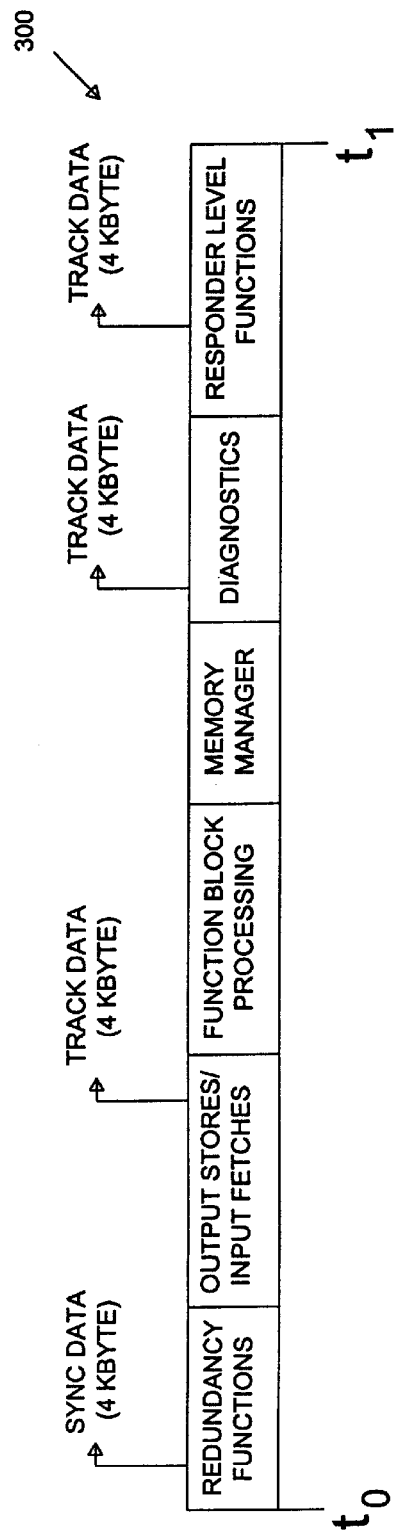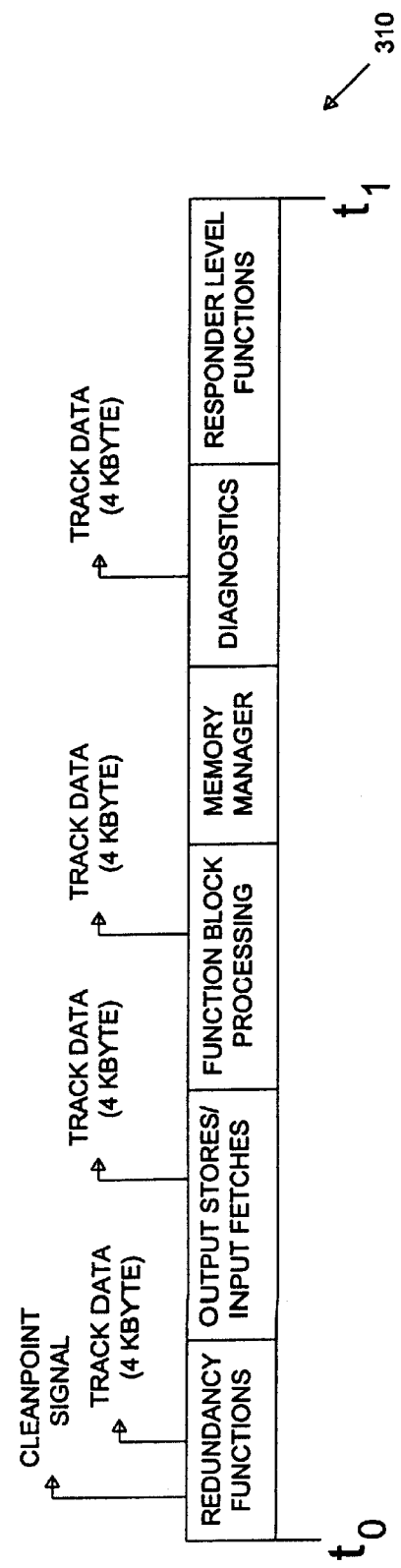

SYSTEMS AND METHODS FOR SYNCHRONIZING REDUNDANT CONTROLLERS WITH MINIMAL CONTROL DISRUPTION

TECHNICAL FIELD OF THE INVENTION

The present invention is directed, in general, to process control systems and, more specifically, to a process control system, and method of operating the same, providing synchronization between a primary controller and a secondary controller with minimum control disruption of the primary controller.

BACKGROUND OF THE INVENTION

Many process facilities (e.g., a manufacturing plant, a mineral or crude oil refinery, etc.) are managed using distributed control systems. Typical contemporary control systems include numerous modules tailored to monitor and/or control various processes of the facility. Conventional means link these modules together to produce the distributed nature of the control system. This affords increased performance and a capability to expand or reduce the control system to satisfy changing facility needs.

Process facility management providers, such as Honeywell, Inc., develop control systems that can be tailored to satisfy wide ranges of process requirements (e.g., global, local or otherwise) and facility types (e.g., manufacturing, warehousing, refining, etc.). Such providers have two principil objectives. The first objective is to centralize control of as many processes as possible to improve an overall efficiency of the facility. The second objective is to support a common interface that communicates data among various modules controlling or monitoring the processes, and also with any such centralized controller or operator center.

Each process, or group of associated processes, has one or more input characteristics (e.g., flow, feed, power, etc.) and one or more output characteristics (e.g., temperature, pressure, etc.) associated with it. Model predictive control ("MPC") techniques have been used to optimize certain processes as a function of such characteristics. One MPC technique uses algorithmic representations of certain processes to estimate characteristic values (represented as parameters, variables, etc.) associated with the processes that can be used to better control such processes. In recent years, physical, economic and other factors have been incorporated into control systems for these associated processes.

Examples of such techniques are described in U.S. Pat. No. 5,351,184, entitled "Method of Multivariable Predictive Control Utilizing Range Control;" U.S. Pat. No. 5,561,599, entitled "Method of Incorporating Independent Feedforward Control in a Multivariable Predictive Controller; " U.S. Pat. No. 5,572,420, entitled "Method of Optimal Controller Design of Multivariable Predictive Control Utilizing Range Control;" and U.S. Pat. No. 5,574,638, entitled "Method of Optimal Scaling of Variables in a Multivariable Predictive Controller Utilizing Range Control," all of which are commonly owned along by the assignee of the present invention and incorporated herein by reference for all purposes (the foregoing issued patents are collectively referred to hereafter as the "Honeywell Patents").

The distributed control systems used to monitor and control a process are frequently linked by common communication pathways, such as by a local area network (LAN) architecture or by a wide area network (WAN) architecture. When a requesting node needs a datum from a responding node, it issues a request for the datum across the network and the responding node then returns the datum back across the network. Many process control systems use a supervisory control LAN or WAN integrated with one or more process control networks. The process control networks contain the basic raw data required by the supervisory control network and other process control networks.

Typically, a supervisory controller is linked to a flexible array of process controllers using communication drivers matched to the specific process controller being interfaced. The supervisory controller maps the essential data of these process controllers into a homogeneous database controlled by the supervisory controller for consistent storage and access by individual process controller or by any client application being executed by the supervisory controller.

To increase the overall reliability of a process facility, redundant process controllers are frequently implemented. A typical implementation is a 1:1 redundancy between a primary process controller and a secondary process controller. In routine operation, the primary process controller controls a selected process, gathers process data (such as temperature, pressure, etc.) from the controlled process, and relays the process data to the supervisory controller and other process controllers. The secondary process controller remains quiescent with respect to control and parameter access, but must be synchronized (or updated) with information from the primary process controller so that the secondary process controller can immediately take over from the primary process controller in the event of a failure of the primary process controller.

However, synchronization of the primary process controller and its associated secondary process controller in many of the prior art systems is an awkward process. In many prior art systems, after a secondary process controller comes on-line, the controlled process is frequently stalled for a period of several to many seconds while the contents of the memory of the primary process controller is transferred to the memory of the secondary process controllers. In many systems, this is an unacceptable condition, since one or more of the client process controllers may require that the most current value of a process datum from another server process controller be immediately available at all times.

In advanced process control systems, control data must be supplied to a process or to other controllers at very high refresh rates. Primary process controllers in these systems have very short base control cycles, typically less than 100 milliseconds. If the time required to update data in the secondary process controller is too great, one or more base control cycles of the primary process controller may be skipped in order to complete the data transfer to the secondary process controller. This also is frequently unacceptable.

There is therefore a need in the art for improved process controllers that provide one or more client applications with faster access to information. In particular, there is a need in the art for improved redundant process controllers that allow the secondary process controller to seamlessly assume control of a process after the failure of the primary process controller. More particularly, there is need in the art for improved redundant process controllers that allow the secondary process controller to be updated with process data from the primary controller without interrupting a foreground operation being performed by the primary process controller.

SUMMARY OF THE INVENTION

To address the above-discussed deficiencies of the-prior art, the present invention provides a system for maintaining data coherency between a primary process controller operable to execute process control tasks and a backup process controller operable to replace the primary process controller upon failure, wherein the primary process controller cyclically executes the process control tasks during base control cycles having a period, T. The system comprises: 1) a tracking circuit operable to detect changed data in a main memory in the primary process controller; 2) a data buffer for temporarily storing the changed data; and 3) data transfer circuitry for transferring the changed data in the data buffer to a backup memory in the backup process controller at least once during each base control cycle of the primary process controller, such that the transfer of changed data does not interfere with execution of the process control tasks.

In one embodiment of the present invention, the data buffer is sufficiently small to allow the transfer of changed data to be completed within the base control cycle.

In another embodiment of the present invention, the tracking circuit detects write operations in the main memory in the primary process controller. In yet another embodiment of the present invention, the tracking circuit detects write operations in a selected shared address space of the main memory in the primary process controller.

In still another embodiment of the present invention, the data transfer circuitry transfers the changed data in the data buffer whenever the data buffer is full.

In a further embodiment of the present invention, the data transfer circuitry establishes data coherency between a selected shared address space of the main memory and the backup memory during an initial phase of operation by transferring a plurality of sub-areas of the selected shared address space from the main memory to the backup memory until all of the selected shared address space of the main memory has been transferred to the backup memory.

In yet another embodiment of the present invention, the tracking circuit detects changed data during the initial phase of operation only in sub-areas of the selected shared address space that have previously been transferred to the backup memory.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 3A is an exemplary timing diagram depicting the transfer of process control data during an initial synchronization phase of operation according to one embodiment of the present invention;

FIG. 3B is an exemplary timing diagram depicting the transfer of process control data during a synchronization maintenance phase of operation according to one embodiment of the present invention;

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged process facility.

Figure 1:
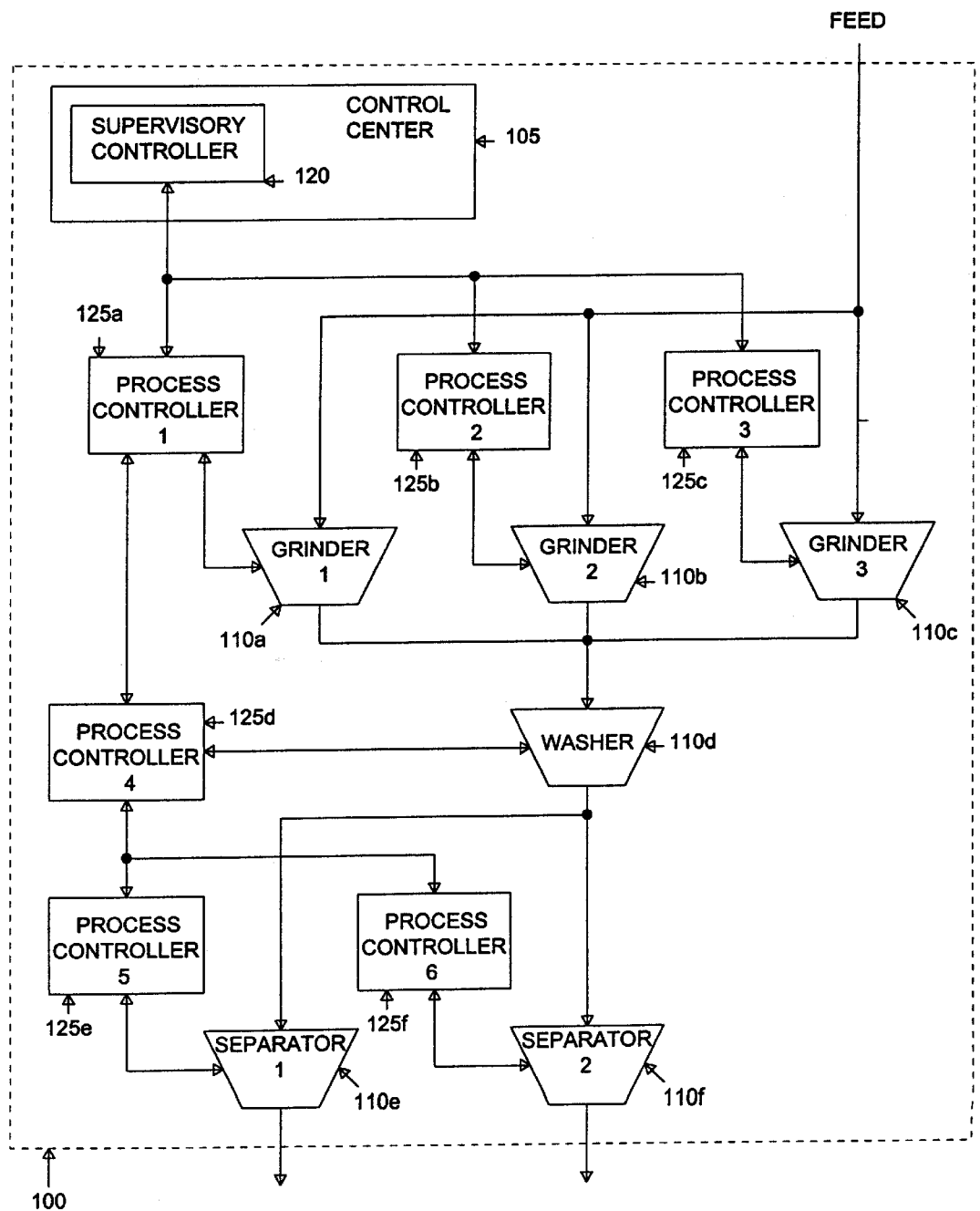
FIG. 1 illustrates a block diagram of a process facility with which a control system according to the principles of the present invention may be used.

FIG. 1 illustrates a block diagram of a process facility 100 in which a control system according to the principles of the present invention may be implemented. Exemplary process facility 100 processes raw materials, and includes a control center 105 and six associated processes, items 110a–110f, arranged in three stages. The term "include," as used herein, means inclusion without limitation. Exemplary control center 105 may comprise a central area that is commonly manned by an operator (not shown) for monitoring and controlling the three exemplary process stages. A first process stage includes three raw material grinders 110a–110c that receive a "feed" of raw material and grind the same, such as by using a pulverizer or a grinding wheel, into smaller particles of raw material. The second process stage includes a washer 110d that receives the ground raw materials and cleans the same to remove residue from the first stage. The third process stage includes a pair of separators 110e and 110f that receive the ground, washed raw materials and separate the same into desired minerals and any remaining raw materials. Since this process facility is provided for purposes of illustration only and the principles of such a facility are well known, further discussion of the same is beyond the scope of this patent document and unnecessary.

The exemplary control system includes a supervisory controller 120 and six process nodes, or process controllers 125a–125f, each of which is implemented in software and executable by a suitable conventional computing system (standalone or network), such as any of Honeywell, Inc.'s AM K2LCN, AM K4LCN, AM HMPU, AxM or like systems. Those skilled in the art will understand that such controllers may be implemented in hardware, software, or firmware, or some suitable combination of the same. In general, the use of computing systems in control systems for process facilities is well known.

Supervisory controller 120 is associated with each of process controllers 125, directly or indirectly, to allow the exchange of information. The phrase "associated with" and derivatives thereof, as used herein, may mean to include within, interconnect with, contain, be contained within, connect to or with, couple to or with, be communicable with, cooperate with, interleave, be a property of, be bound to or with, have, have a property of, or the like. Supervisory controller 120 monitors characteristics (e.g., status, temperature, pressure, flow rate, current, voltage, power, utilization, efficiency, cost and other economic factors, etc.) of associated processes 110, either directly or indirectly through process controllers 125 associated with processes 110. Depending upon the specific implementation, such monitoring may be of an individual process, a group of processes, or the whole facility.

Supervisory controller 120 communicates with associated processes 110 via process controllers 125 and generates supervisory data in order to optimize process facility 100. The phrase "supervisory data," as used herein, is defined as any numeric, qualitative or other value generated by supervisory controller 120 to control (e.g., direct, manage, modify, recommend to, regulate, suggest to, supervise, cooperate, etc.), for example, a particular process, a group of processes, the whole facility, a process stage, a group of stages, a sequence of processes or stages, or the like, to optimize the facility as a whole. In a preferred embodiment, the supervisory data is dynamically generated and is based at least upon a given facility's efficiency, production or economic cost, and most preferably all three.

Process controllers 125 monitor associated processes 110 and operate to varying degrees in accordance with the supervisory data to control the associated processes, and, more particularly, to modify one or more processes and improve the monitored characteristics and the facility as a whole. The relationship between supervisory controller 120 and various ones of process controllers 125 may be master-slave (full compliance), cooperative (varying compliance, such as by using the supervisory data as a factor in controlling the associated processes), or complete disregard (noncompliance). Depending upon the specific implementation and the needs of a given facility, the relationship between supervisory controller 120 and a specific process controller 125 may be static (i.e., always only one of compliance, cooperative, or noncompliance), dynamic (i.e., varying over time, such as within a range between compliance and noncompliance, or some lesser range in between), or switching between static periods and dynamic periods.

FIG. 1 depicts the process controllers 125a–f as simple logical blocks coupled to the processes 110a–f for purposes of illustration only. In reality, the process controllers 125a–f may be implemented in process facility 100 as any of a wide range of devices. In the simplest embodiments, an exemplary process controller 125 may be micro-controller circuit fabricated on a circuit board and integrated into one of the processes 110 (i.e, part of a separator, washer, or grinder) that is being controlled. In other embodiments, an exemplary process controller 125 may be a stand-alone computer, such as a personal computer (PC), that is remote from the controlled process 110 and coupled to it by a bus architecture.

In more complex embodiments, an exemplary process controller 125 may be a network node coupled to one or more process(es) 110 by a network architecture. The supervisory controller 120 may then treat the network containing the exemplary process controller 125 and its associated processes 110 as a single functional group. Finally, an exemplary process controller 125 may be a group of process controllers and their associated processes 110 that are networked together. The networked group may then be treated as a single functional group by supervisory controller 120.

The process controllers 125a–f produce process data that is used by the supervisory controller 120 for a variety of purposes, including generating the supervisory data and distributing the process data to one or more client applications. Process data may also be used by the process controller 125 that produced it to control the associated process 110. For example, a process controller 125 may read physical parameter data from a process 110, such as temperature, pressure, flow rate, and the like, and use some or all of that process data and, perhaps, some supervisory data to control the process 110. This is particularly true in a feedback-controlled process.

Process data may be transferred directly between process controllers 125a–f in a peer-to-peer relationship, as in a LAN network. For example, process controller 4, which controls the washer (item 110d), may request process data from process controllers 1–3, which control grinders 1–3, in order to determine the rate at which ground raw material is being output from grinders 1–3. The washer may thereby adjust the rate at which it washes the ground material. For example, the washer may reduce the amount of power that it uses to wash the ground raw material when the amount of ground raw material being sent to the washer is relatively low. It may even temporarily shut down in order to "hold and wait" for a suitable amount of ground raw material to accumulate before it resumes washing.

In some embodiments of the present invention, the supervisory controller 120 may comprise a LAN, a group of connected LANs, or a WAN architecture. One or more client applications are executed on nodes of the LAN/WAN architecture. The nodes may be, for example, personal computers (PCs). The client applications may all require the same process data and supervisory data to be transferred at the same update rate from the process controllers. However, a more likely scenario is that the client applications require different, possibly over-lapping, subsets of the process data and supervisory data and require the process data and supervisory data to be transferred at different update rates to different client applications.

To increase the overall reliability of process facility 100, one or more of process controllers 125a–f may be implemented as redundant process controllers. That is, one or more of process controllers 125a–f may actually comprise a primary control processor module and a secondary control processor module, whereby the primary control processor module performs the foreground control tasks associated with one of processes 110a–f, while the secondary control processor module remains passive with respect to processes 110a–f, but is continually updated with "synchronization" data from the primary control processor module. To facilitate the inter-operation of these primary and secondary control processor modules, the present invention provides an improved redundant process controller that causes minimal disruption of the foreground tasks performed by the primary control processor module while maintaining synchronization (or data coherency) with the secondary control processor module.

Figure 2:
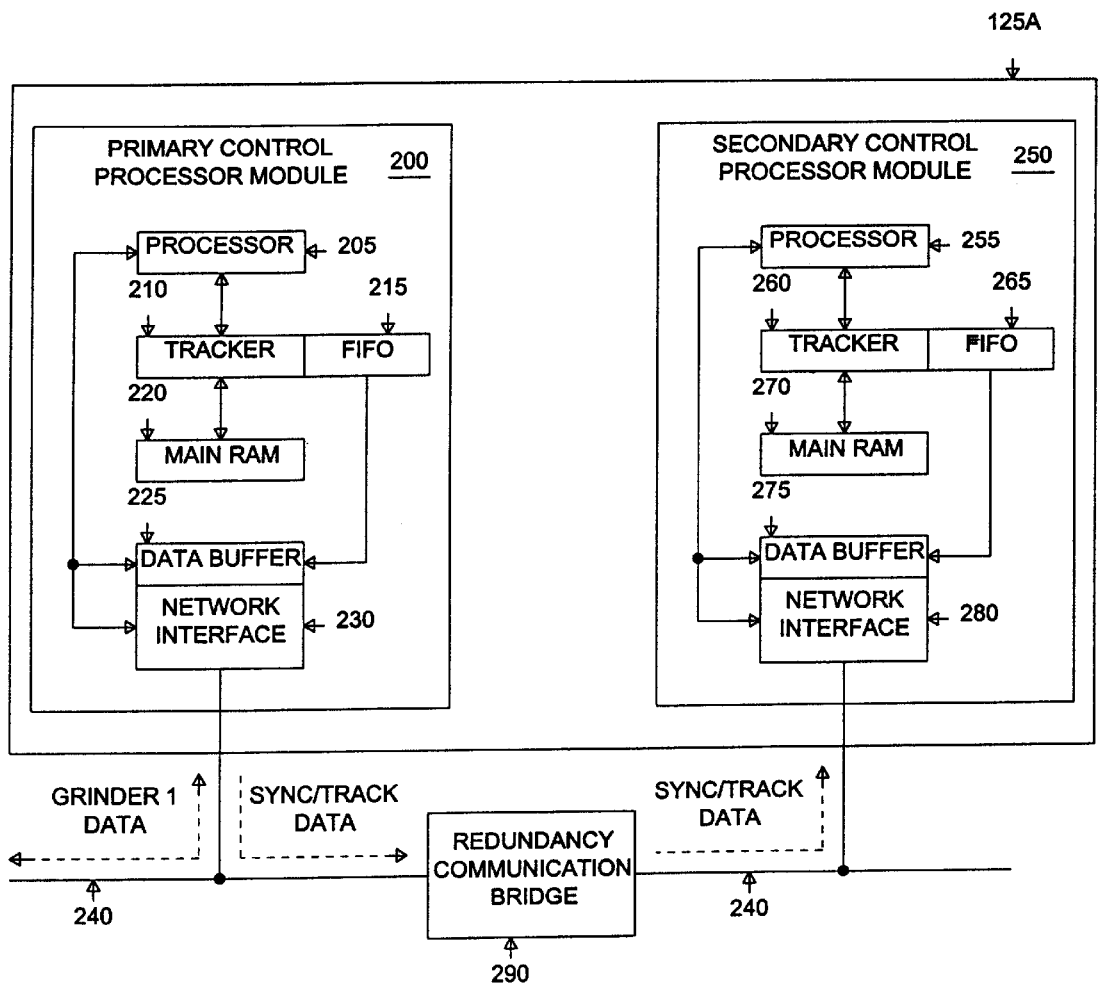
FIG. 2 illustrates an exemplary redundant process controller according to one embodiment of the present invention.

FIG. 2 illustrates an exemplary redundant process controller 125a according to one embodiment of the present invention. Process controller 125a comprises a primary control processor module 200 and a secondary control processor module 250. Primary control processor module 200 comprises a processor 205 and a main RAM 220 that execute the routine control functions performed by process controller 125 with respect to grinder 1 (i.e., process 110a). A network interface 230 in primary control processor module 200 receives and sends data and control signals to and from grinder 1 and the remainder of process facility 100 via network link 240. Secondary control processor module 250 also comprises a processor 255 and a main RAM 270 capable of performing the identical process control functions performed by processor 205 and main RAM 220 in primary control processor module 200. A network interface 280 in secondary control processor module 250 also receives and sends data and control signals to and from grinder 1 and the remainder of process facility 100 via network link 240.

The designations "primary" and "secondary" are arbitrary with respect to the primary control processor module 200 and the secondary control processor module 250. The designations "primary" and "secondary" are a function of configuration, rather than fixed hardware design. In a preferred embodiment of the present invention, the two modules are functionally interchangeable. Either may be an active "primary" controller with respect to grinder 1 and either may be a passive "secondary" controller with respect to grinder 1. That is, if the primary control processor module 200 malfunctions, the secondary control processor module 250 may take its place as the active controller for grinder 1. When the primary control processor module 200 is repaired, the secondary control processor module 250 may remain as the active controller for grinder 1, while the repaired primary control processor 200 becomes a passive (or secondary) controller. Alternatively, when the primary control processor module 200 is repaired, the secondary control processor module 250 may revert to being a passive controller for grinder 1, while the repaired primary control processor 200 again becomes the active controller for grinder 1.

In order to synchronize the primary control processor module 200 with the secondary control processor module 250, primary control processor module 200 employs a tracker 210, a FIFO 215, and a data buffer 225 associated with network interface 230. The secondary control processor module 250 also comprises a tracker 260, a FIFO 265, and a data buffer 275 associated with network interface 280.

Tracker 210 is a controller hardware engine that detects and captures write operations by processor 205 to main RAM 220. Corresponding portions of main RAM 220 and main RAM 270 are designated as "Logical Shared Memory" that must be maintained in identical states in primary control processor module 200 and secondary control processor module 250. Therefore, an initial copy of the Logical Shared Memory portion of main RAM 220 must be transferred to main RAM 270 and repeatedly updated thereafter in order to obtain and maintain "synchronization" (or data coherency) between primary control processor module 200 and secondary processor module 250.

When tracker 210 is enabled, all write operations into the Logical Shared Memory portion of main RAM 220 are duplicated into FIFO 215, which may be, for example, 512 bytes in size. When FIFO 215 is full, the contents of FIFO 215 are transferred to data buffer 225. Data buffer 225, which may be, for example, four kilobytes in size, accumulates the FIFO 215 data for later transfer to data buffer 275 in secondary control processor module 250 via network interfaces 230, redundancy communication bridge 290 and network interface 280. To avoid waiting for acknowledgment of transmission of the data from data buffer 225, a preferred embodiment of the present invention implements a multiple buffering scheme for data buffer 225, so that a buffer is always available for the accumulation of FIFO 215 data.

As will be explained below in greater detail, during an initial synchronization phase of operation, all of the Logical Shared Memory portion of primary control processor module 200 is transferred in consecutive blocks, referred to as "sync data", once per base control cycle execution in primary control processor module 200. Sync data is continually transferred to secondary control processor module 250 until one complete copy of the Logical Shared Memory is copied into main RAM 270 of secondary control processor module 250. Thereafter, as changes are made to the Logical Shared Memory portion of main RAM 220, tracker 210 captures the write operations and stores them in data buffer 225 (via FIFO 215). The changed data in data buffer 225, now referred to as "track data," is then transferred to main RAM 270 of secondary control processor module 250, at least once per base control cycle execution of primary control processor module 200.

FIG. 3A is an exemplary timing diagram 300 depicting the transfer of process control data during an initial synchronization phase of operation according to one embodiment of the present invention. Timing diagrams 300 shows the execution from a start point, $t_0$, to an end point, $t_1$, of one complete exemplary base control cycle in primary control processor module 200. In a preferred embodiment of the present invention, one base control cycle execution has a period of fifty (50) milliseconds.

A base control cycle execution comprises a redundancy functions segment, an output stores/input fetches segment, a function block processing segment, a memory manager segment, a diagnostics segment, and a responder level functions segment. The redundancy functions segment is responsible for sending sync-data from the primary control processor module 200 to the secondary control processor module 250 at the start of the base control cycle. For example, during this segment, data is copied from the main RAM 220 into the 4-Kilobyte data buffer 225. The contents of the full data buffer 225 are then transferred as a 4 Kbyte block to the secondary control processor module 250.

Sync data is repeatedly transferred during the initial synchronization phase until one complete copy of the Logical Shared Memory space in main RAM 220 is transferred to main RAM 270. To minimize interference with the foreground control functions performed by the primary control processor module 200, sync data is transferred only once per base control cycle during the initial synchronization phase.

In one embodiment of the present invention, track data that is intermittently transferred during initial synchronization updates only those areas of the Logical Shared Memory in the secondary control processor module 250 that have already been transferred as part of sync data. This advantageously avoids the transfer of updates to data that have not yet been initialized.

In an alternate embodiment of the present invention, track data that is intermittently transferred during initial synchronization updates all areas of the Logical Shared Memory in the secondary control processor module 250, whether or not the data has already been transferred and initialized as part of sync data. Thus, any change in the Logical Shared Memory in the primary process controller module 200 is transferred as part of the track data. In this embodiment, the secondary control processor module 250 ignores any track data that is intended to modify a portion of Logical Shared Memory that has not yet been initialized as sync data. Advantageously, this embodiment simplifies the tracker 210, which is not required to monitor which portions of the Logical Shared Memory have already been transferred.

By way of example, if the Logical Shared Memory portion of main RAM 220 is 4 Mbytes, data buffer 225 is 4 Kbytes, and the base execution cycle has a period of 50 milliseconds, then the first base control cycle transfers sync data to the first 4 Kbytes of Logical Shared Memory in the secondary control processor module 250. According to which embodiment is implemented, any track data also transferred during the first base control cycle may include updates only to the same first 4 Kbytes of Logical Shared Memory in the secondary control processor module 250, or may include updates to all of Logical Shared Memory in the secondary control processor module 250, in which case the secondary control processor module 250 may ignore updates outside of the first 4 Kbytes of Logical Shared Memory.

Correspondingly, the second base control cycle transfers sync data to the second 4 Kbytes of Logical Shared Memory in the secondary control processor module 250 and any track data also transferred during the second base control cycle may include updates only to the first 8 Kbytes of Logical Shared Memory in the secondary control processor module 250, or may include updates to all of Logical Shared Memory in the secondary control processor module 250, in which case the secondary control processor module 250 may ignore updates outside of the first 8 Kbytes of Logical Shared Memory. The third base control cycle transfers sync data to the third 4 Kbytes of Logical Shared Memory in the secondary control processor module 250 and any track data transferred during the third base control cycle may include updates only to the first 12 Kbytes of Logical Shared Memory in the secondary control processor module 250, or may include updates to all of Logical Shared Memory in the secondary control processor module 250, in which case the secondary control processor module 250 may ignore updates outside of the first 12 Kbytes of Logical Shared Memory, and so forth.

Thus, in the first one second time period of initial synchronization, twenty base control cycles are executed, transferring 80 Kbytes of sync data to the secondary control processor module 250. The initial synchronization phase of operation therefore requires fifty (50) seconds to transfer one complete 4 Mbyte copy of the Logical Shared Memory to the secondary control processor module 250. All of the transfers of track data that occur during the initial synchronization phase are also 4 Kbyte-size updates of sync data that occur intermittently whenever data buffer 225 becomes full.

The output stores/input fetches segment is one of two primary functions executed by the control kernel of the control software in the primary control processor module 200. During this period, the control kernel uses software I/O modules to perform input fetch operations of the most recent input data received from grinder 1 and/or the remainder of process facility 100 and to perform output write operations to the rest of process facility 100 of output data that were computed in the previous base control cycle.

The function block processing segment is the second of two primary functions executed by the control kernel of the control software in the primary control processor module 200. The function block processing executes non-I/O processing modules, such as algorithmic logic blocks that implement the control strategy for grinder 1.

The memory manager segment performs memory compaction by moving function blocks to thereby eliminate blank memory areas between function blocks. This de-fragmentation of memory is performed in both the primary control processor module 200 and the secondary control processor module 250. In a preferred embodiment of the present invention, the de-fragmentation is replicated in the secondary control processor module 250 by sending embedded messages as part of track data that inform the secondary control processor module 250 of the size and the original starting address of each block of data that has been moved in the primary control processor module 200, as well as the starting address of the block's final destination. The secondary control processor module 250 may then replicate the memory block transfer without the need for transmitting the captured tracked write operations as a consequence of the block move from the primary control processor module 200 to the secondary control processor module 250.

The diagnostics segment verifies the operation of the tracker 210 by performing an end-to-end check sum of the data that is transferred from the primary control processor module 200 to the secondary control processor module 250. The check sum value is performed on the 4 Kbyte block in the data buffer 225 and sent along with the sync/track data to the secondary control processor module 250. The secondary control processor module 250 then verifies the check sum value to ensure the sync/track data was properly received.

Finally, the responder level functions segment initializes and monitors the network connections with other process controllers 125, grinder 1, and supervisory controller 120. Depending of the network architecture implemented in process facility 100, these connections may be client/server connections, peer-to-peer connections, or the like.

FIG. 3B is an exemplary timing diagram 310 depicting the transfer of process control data during a synchronization maintenance phase of operation according to one embodiment of the present invention. Timing diagrams 310 shows the execution from a start point, $t_0$, to an end point, $t_1$, of one complete exemplary base control cycle in primary control processor module 200. As before, one base control cycle execution has a period of fifty (50) milliseconds.

The fundamental parts of the base control cycle execution do not change between the initial synchronization phase of operation and the synchronization maintenance phase of operation. Once again, a base control cycle execution comprises a redundancy functions segment, an output stores/input fetches segment, a function block processing segment, a memory manager segment, a 118 diagnostics segment, and a responder level functions segment. Now, however, it is no longer necessary to transfer a 4 Kbyte block of sync data during each base control cycle execution, since all of the sync data has been transferred during initial synchronization. During synchronization maintenance, track data is intermittently sent in 4 Kbyte blocks whenever data buffer 225 becomes full.

At the start of each base control cycle, a clean point signal is sent to the secondary control processor module 250. The clean point signal indicates to the secondary control processor module 250 that the track data the secondary control processor module 250 has accumulated since the last clean point signal is complete and coherent. This protects the secondary control processor module 250 from situations in which, for example, the first half of a write operation is captured by tracker 210 and is transferred immediately to the secondary control processor module 250 because data buffer 225 was coincidentally full at that particular moment. The data thus transferred would be incomplete (and unreliable) until the second half of the write operation is transferred in the next track data block sent by data buffer 225. To ensure against this occurrence, the track data is buffered in the secondary control processor module 250 until the next clean point signal is received, at which time the track data is written into main RAM 270. At the time of failure of the primary control processor module 200, any incomplete track data (i.e., track data for which a clean point signal has not been received) in the secondary control processor module 250 is discarded. The secondary control processor module 250 then starts at a point at which the memory image is coherent with respect to the last clean point received.

Figure 4:
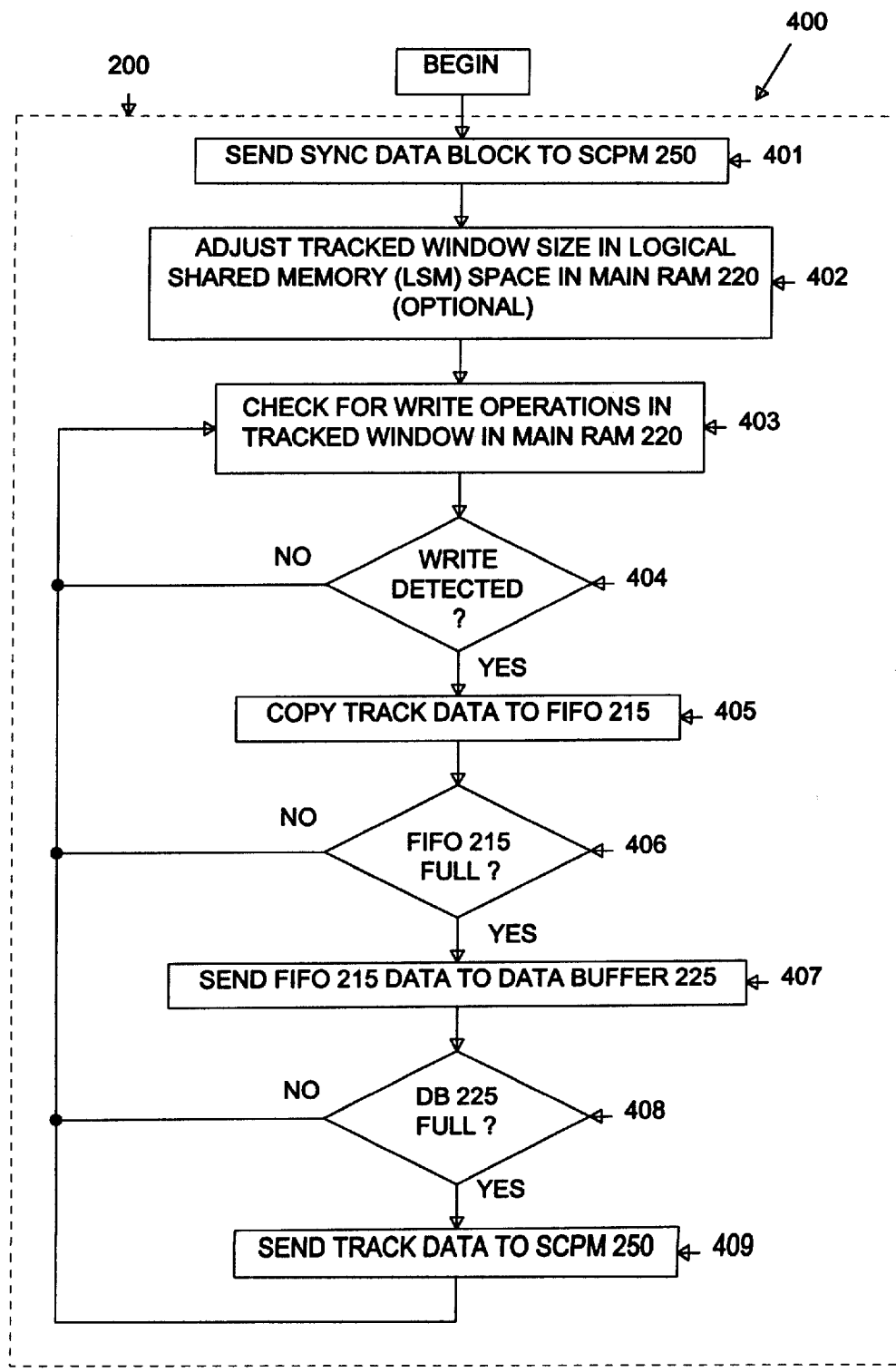
FIG. 4 is a flow diagram illustrating the operation of the primary control processor module during one base control cycle execution in the initial synchronization phase of operation according to one embodiment of the present invention.

FIG. 4 is a flow diagram 400 illustrating the operation of the primary control processor module 200 during one base control cycle execution in the initial synchronization phase of operation according to one embodiment of the present invention. At the start of the base control cycle, the primary control processor module 200 identifies the next (or perhaps first) 4 Kbyte block of the Logical Shared Memory required by the secondary control processor module 250 and sends it as sync data to the secondary control processor module 250 (process step 401).

In those embodiments of the present invention in which track data updates only those areas of the Logical Shared Memory in the secondary control processor module 250 that have already been transferred as part of sync data, the primary control processor module 200 adjusts the size of the tracking window that tracker 210 is monitoring in the Logical Shared Memory in main RAM 220 to account for the most recent transfer of sync data to the secondary control processor module 250 (process step 402). Tracker 210 then monitors the tracking window to verify if write operations occur in the address space defined by the tracking window (process step 403). If no write operation is detected, the tracker 210 continues to monitor the tracking window for write operations (process steps 404 and 403).

In those alternate embodiments of the present invention in which track data updates all areas of the Logical Shared Memory in the secondary control processor module 250 without regard to whether or not the data has previously been transferred as part of sync data, process step 402 may be omitted since the tracking window for tracker 210 covers all of the Logical Shared Memory.

If a write operation is detected, the changed data is written to FIFO 215 (process steps 404 and 405). If FIFO 215 is not full, tracker 210 continues to monitor the tracking window for write operations (process steps 406 and 403). If FIFO 215 is full, the contents of FIFO 215 are transferred to data buffer 225 (process steps 406 and 407). If data buffer 225 is not full, tracker 210 continues to monitor the tracking window for write operations (process steps 408 and 403). If data buffer 225 is full, the contents of data buffer 225 are transferred as track data to secondary control processor module 250 (process steps 408 and 409).

Figure 5:
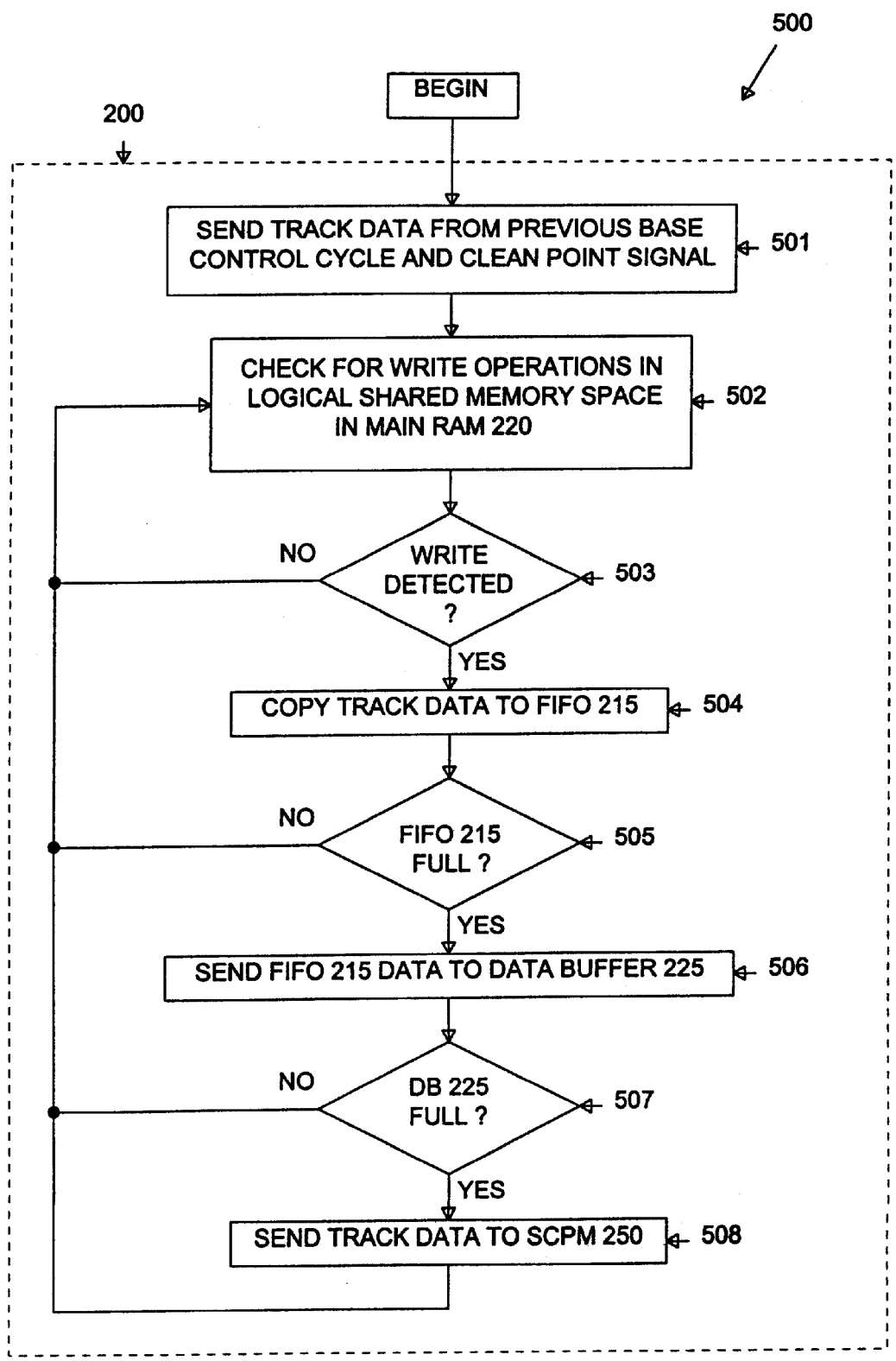
FIG. 5 is a flow diagram illustrating the operation of the primary control processor module during one base control cycle execution in the synchronization maintenance phase of operation according to one embodiment of the present invention.

FIG. 5 is a flow diagram 500 illustrating the operation of the primary control processor module 200 during one base control cycle execution in the synchronization maintenance phase of operation according to one embodiment of the present invention. At the start of the base control cycle, the primary control processor module 200 sends any track data that accumulated in data buffer 225 during the previous base control cycle to the secondary control processor module 250, thereby ensuring at least one transfer of track data per base control cycle. The primary control processor module 200 also sends a clean point signal (process step 501).

Next, tracker 210 monitors the Logical Shared Memory address space in main RAM 220 to verify if any write operations occur anywhere in the address space of the Logical Shared Memory (process step 502). If no write operation is detected, the tracker 210 continues to monitor the tracking window for write operations (process steps 503 and 502).

If a write operation is detected, the changed data is written to FIFO 215 (process steps 503 and 504). If FIFO 215 is not full, the tracker 210 continues to monitor the tracking window for write operations (process steps 505 and 502). If FIFO 215 is full, the contents of FIFO 215 are transferred to data buffer 225 (process steps 505 and 506). If data buffer 225 is not full, the tracker 210 continues to monitor the tracking window for write operations (process steps 507 and 502). If data buffer 225 is full, the contents of data buffer 225 are transferred as track data to the secondary control processor module 250 (process steps 507 and 508).

The above-described embodiment of the present invention provides a "trickle" method of synchronizing primary control processor module 200 and secondary control processor module 250. Rather than intermittently halting the foreground tasks executed by primary control processor module 200 while a large block of track data is transferred to secondary control processor module 250, the present invention provides a stream of much smaller blocks of updated track data synchronous with each base control cycle execution.

By making data buffer 225 and FIFO 215 sufficiently small, the time required to transfer a block of sync and/or track data to the secondary control processor module 250 may be kept sufficiently short so that the transfer or one of more sync/track data blocks may be completed within a single base control cycle execution. This provides a more seamless synchronization between the redundant controllers, thereby acquiring a synchronized secondary control processor module 250 without impacting the normal operations of the primary control processor module 200.

Although the present invention and its advantages have been described in detail, those skilled in the art should understand that they can make various changes, substitutions and alterations herein without departing from the spirit and scope of the invention in its broadest form.

What is claimed is:

1. For use in a process control system, a system for maintaining data coherency between a primary process controller operable to execute process control tasks for controlling a physical process and a backup process controller operable to replace said primary process controller upon failure, wherein said primary process controller cyclically executes said process control tasks during base control cycles having a period, T, said system comprising:

a tracking circuit operable to detect changed data in a main memory in said primary process controller;

a data buffer for temporarily storing said changed data wherein said changed data is continuously stored in said data buffer until said data buffer is full; and data transfer circuitry for transferring said changed data in said data buffer to a backup memory in said backup process controller at least once during each base control cycle of said primary process controller together with process data within said base control cycle for executing said process control tasks, such that said transfer of changed data does not interfere with execution of said process control tasks.

2. The system set forth in claim 1 wherein said data buffer is sufficiently small to allow said transfer of changed data to be completed within said base control cycle.

3. The system set forth in claim 1 wherein said tracking circuit detects write operations in said main memory in said primary process controller.

4. The system set forth in claim 3 wherein said tracking circuit detects write operations in a selected shared address space of said main memory in said primary process controller.

5. The system set forth in claim 1 wherein said data transfer circuitry transfers said changed data in said data buffer whenever said data buffer is full.

6. The system set forth in claim 1 wherein said data transfer circuitry establishes data coherency between a selected shared address space of said main memory and said backup memory during an initial phase of operation by transferring a plurality of sub-areas of said selected shared address space from said main memory to said backup memory until all of said selected shared address space of said main memory has been transferred to said backup memory.

7. The system set forth in claim 6 wherein said tracking circuit detects changed data during said initial phase of operation only in sub-areas of said selected shared address space that have previously been transferred to said backup memory.

8. A process facility comprising at least one redundant controller for controlling a selected physical process, said redundant controller comprising:
  a primary process controller operable to cyclically execute process control tasks for controlling a physical process during base control cycles having a period, T;
  a main memory associated with said primary process controller for storing process data;
  a backup process controller operable to replace said primary process controller upon failure;
  a backup memory associated with said backup process controller for storing process data; and
  a memory coherency unit for maintaining coherency between process data in said main memory and process data in said backup memory, said memory coherency unit comprising:
    a tracking circuit operable to detect changed process data in said main memory;
    a data buffer for temporarily storing said changed process data wherein said changed data is continuously stored in said data buffer until said data buffer is full; and
    data transfer circuitry for transferring said changed process data in said data buffer to said backup memory at least once during each base control cycle together with process data within said base control cycle for executing said process control tasks, such that said transfer of changed process data does not interfere with execution of said process control tasks.

9. The process facility set forth in claim 8 wherein said data buffer is sufficiently small to allow said transfer of said changed process data to be completed within said base control cycle.

10. The process facility set forth in claim 8 wherein said tracking circuit detects write operations in said main memory.

11. The process facility set forth in claim 10 wherein said tracking circuit detects write operations in a selected shared address space of said main memory.

12. The process facility set forth in claim 8 wherein said data transfer circuitry transfers said changed process data whenever said data buffer is full.

13. The process facility set forth in claim 8 wherein said memory coherency circuit establishes data coherency between a selected shared address space of said main memory and said backup memory during an initial phase of operation by transferring a plurality of sub-areas of said selected shared address space from said main memory to said backup memory until all of said selected shared address space of said main memory has been transferred to said backup memory.

14. The process facility set forth in claim 13 wherein said tracking circuit detects changed process data during said initial phase of operation only in sub-areas of said selected shared address space that have previously been transferred to said backup memory.

15. For use in a process control system, a method for maintaining data coherency between a primary process controller operable to execute process control tasks for controlling a physical process and a backup process controller operable to replace the primary process controller upon failure, wherein the primary process controller cyclically executes the process control tasks during base control cycles having a period, T, the method comprising the steps of:
  detecting changed data in a main memory in the primary process controller;
  temporarily storing the changed data in a data buffer until said data buffer is full; and
  transferring the changed data in the data buffer to a backup memory in the backup process controller at least once during each base control cycle of the primary process controller together with process data within said base control cycle for executing said process control tasks, such that the transfer of changed data does not interfere with execution of the process control tasks.

16. The method set forth in claim 15 wherein the data buffer is sufficiently small to allow the transfer of changed data to be completed within the base control cycle.

17. The method set forth in claim 15 wherein the step of detecting changed data includes the sub-step of detecting write operations in the main memory in the primary process controller.

18. The method set forth in claim 17 wherein the step of detecting changed data includes the sub-step of detecting write operations in a selected shared address space of the main memory in the primary process controller.

19. The method set forth in claim 15 wherein the step of transferring the changed data is performed whenever the data buffer is full.

20. The method set forth in claim 15 including the further step of establishing data coherency between a selected shared address space of the main memory and the backup memory during an initial phase of operation by transferring a plurality of sub-areas of the selected shared address space from the main memory to the backup memory until all of the selected shared address space of the main memory has been transferred to the backup memory.

21. The method set forth in claim 20 including the further step of detecting changed data during the initial phase of operation only in sub-areas of the selected shared address space that have previously been transferred to the backup memory.

* * * * *